US 8,965,172 B2

(12) United States Patent
Yu et al.

(10) Patent No.: US 8,965,172 B2
(45) Date of Patent: Feb. 24, 2015

(54) MULTI-SCREEN VIDEO PLAYBACK SYSTEM AND RELATED COMPUTER PROGRAM PRODUCT FOR DYNAMICALLY GENERATING SCALED VIDEO

(71) Applicant: Realtek Semiconductor Corp., Hsinchu (TW)

(72) Inventors: Siu-Leong Yu, Hsinchu County (TW); Shih-Chun Wei, Hsinchu (TW); Chen Ma, San Jose, CA (US)

(73) Assignee: Realtek Semiconductor Inc., Hsinchu (TW)

( * ) Notice: Subject to any disclaimer, the term of this patent is extended or adjusted under 35 U.S.C. 154(b) by 46 days.

(21) Appl. No.: 13/858,566

(22) Filed: Apr. 8, 2013

(65) Prior Publication Data
US 2013/0266286 A1  Oct. 10, 2013

Related U.S. Application Data

(60) Provisional application No. 61/620,988, filed on Apr. 6, 2012, provisional application No. 61/727,745, filed on Nov. 18, 2012.

(30) Foreign Application Priority Data

Apr. 3, 2013 (TW) .............................. 102112247 A

(51) Int. Cl.
| | |
|---|---|
| H04N 5/765 | (2006.01) |
| H04N 9/87 | (2006.01) |
| H04N 9/82 | (2006.01) |
| H04N 21/41 | (2011.01) |
| H04N 21/442 | (2011.01) |

(52) U.S. Cl.
CPC .............. *H04N 9/87* (2013.01); *H04N 9/8227* (2013.01); *H04N 21/4122* (2013.01); *H04N 21/4126* (2013.01); *H04N 21/44222* (2013.01)
USPC ......................................... 386/230; 386/248

(58) Field of Classification Search
None
See application file for complete search history.

(56) References Cited

U.S. PATENT DOCUMENTS

| | | | | |
|---|---|---|---|---|
| 2006/0114987 | A1* | 6/2006 | Roman | 375/240.01 |
| 2010/0171863 | A1* | 7/2010 | Kim et al. | 348/333.11 |
| 2010/0262913 | A1* | 10/2010 | Takagi | 715/723 |
| 2013/0040623 | A1* | 2/2013 | Chun et al. | 455/414.2 |

* cited by examiner

*Primary Examiner* — William C Vaughn, Jr.
*Assistant Examiner* — Eileen Adams
(74) *Attorney, Agent, or Firm* — Birch, Stewart, Kolasch & Birch, LLP

(57) ABSTRACT

A multi-screen video playback system includes: a video playback device having a main display, a portable communication device having a screen, and a multi-screen display controlling server. The multi-screen display controlling server transmits a target video to the video playback device via a network so that the video playback device utilizes the main display to display the target video. While the main display displays the target video, if the multi-screen display controlling server received a selection message corresponding to a position of a partial region of the main display, the multi-screen display controlling server dynamically generates a scaled video corresponding to images displayed on the partial region and transmits the scaled video to the portable communication device via a network so that the portable communication device simultaneously displays the scaled video on the screen.

19 Claims, 8 Drawing Sheets

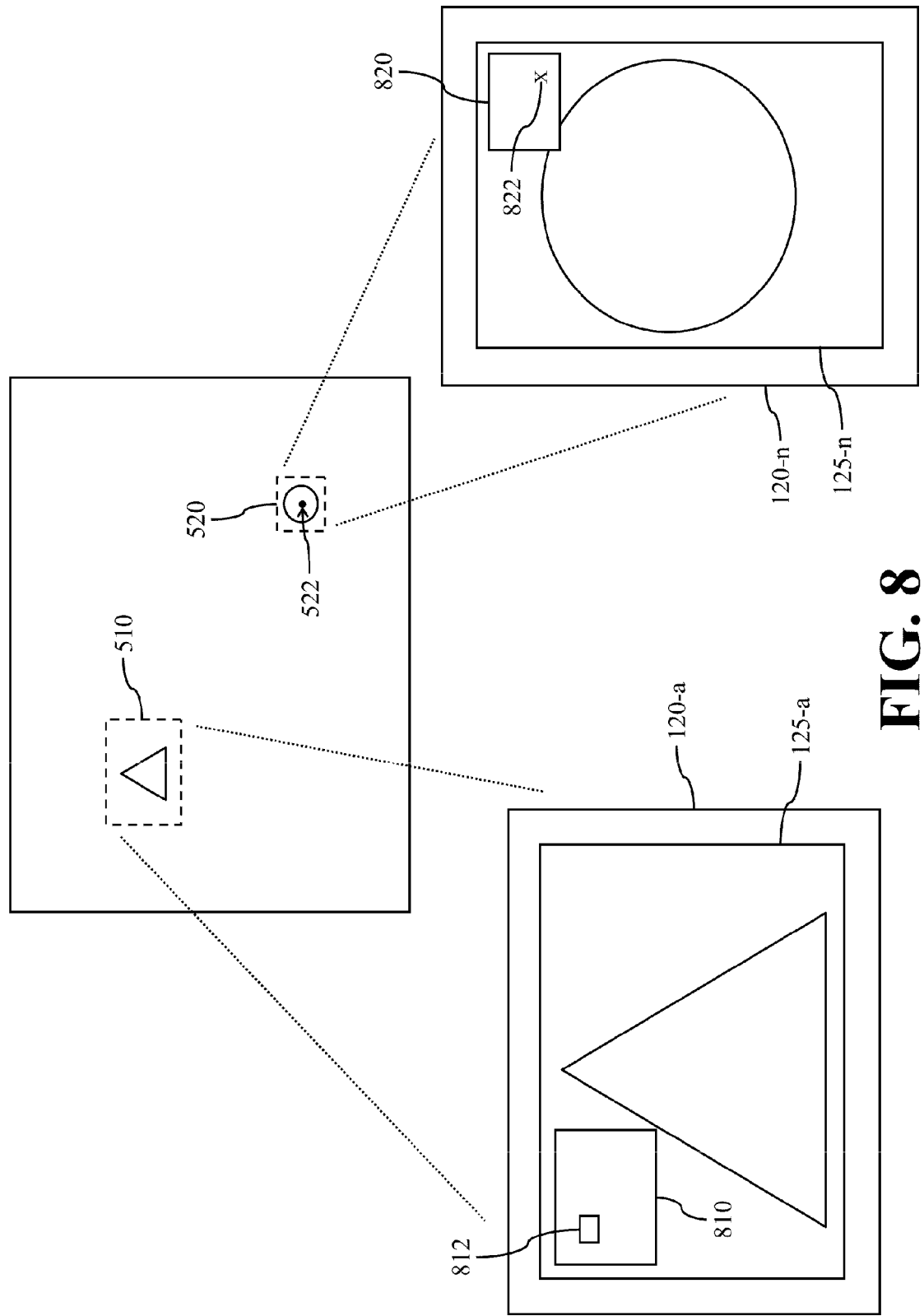

MULTI-SCREEN VIDEO PLAYBACK SYSTEM AND RELATED COMPUTER PROGRAM PRODUCT FOR DYNAMICALLY GENERATING SCALED VIDEO

CROSS-REFERENCE TO RELATED APPLICATIONS

This application claims the benefit of priority to U.S. Provisional Application Ser. No. 61/620,988, filed on Apr. 6, 2012; the entirety of which is incorporated herein by reference for all purposes.

This application claims the benefit of priority to U.S. Provisional Application Ser. No. 61/727,745, filed on Nov. 18, 2012; the entirety of which is incorporated herein by reference for all purposes.

This application claims the benefit of priority to Patent Application No. 102112247, filed in Taiwan on Apr. 3, 2013; the entirety of which is incorporated herein by reference for all purposes.

BACKGROUND

The disclosure generally relates to a video playback system and, more particularly, to a multi-screen video playback system for dynamically generating scaled video and related computer program product.

Traditional video playback systems are single-screen systems. No matter the audiences choose to watch movies in the movie theaters or choose to watch videos or TV programs at home by using a home theater system, they can only watch the video or TV programs through the pre-installed single screen. Therefore, while the screen displays the video, if the video audience is interested in a specific image area in the video and wants to zoom in (enlarge) the image of the specific image area for watching further details, the video audience will face many problems.

Firstly, the image quality of the zoomed in version of the specific image area is mainly determined by the video resolution and the performance of the image scaling operation of the video playback system. It is difficult to render high quality zoomed in images if the video resolution or the performance of the image scaling operation of the video playback system is insufficient, and thus unable to display image details of sufficient clearness.

Additionally, in the traditional single-screen video playback system, when the zoomed in version of the specific image area is displayed on the screen, the images in other areas will be inevitably blocked out, thereby adversely affecting the integrity of the video content.

Furthermore, in the applications where multiple audiences get together to watch the same video from the same screen, different audiences may be interested in different image areas in the video. The traditional single-screen video playback system is unable to simultaneously provide zoomed in versions of different image areas to different audiences.

Apparently, it is difficult for the movie producer or TV producer to create more diversified approaches for presenting video in view of the limited number of screen in the existing video playback system, and it is thus difficult for the movie industry to provide the audiences with more rich and more different experience in watching videos.

SUMMARY

An example embodiment of a multi-screen video playback system for dynamically generating a scaled video is disclosed, comprising: a video playback device comprising a main display; a first portable communication device comprising a first screen; and a multi-screen display controlling server, configured to operably establish a device group relationship between the video playback device and the first portable communication device, and to transmit a target video to the video playback device via a network so that the video playback device displays the target video on the main display; wherein while the main display displays the target video, if the multi-screen display controlling server received a first selection message corresponding to a position of a first partial region of the main display, the multi-screen display controlling server dynamically generates a first scaled video corresponding to images displayed on the first partial region and transmits the first scaled video to the first portable communication device via a network, so that the first portable communication device simultaneously displays the first scaled video on the first screen.

An example embodiment of a computer program product is disclosed. The computer program product is stored in a non-transitory storage device of a multi-screen display controlling server for dynamically generating a scaled video. When the computer program product is executed by a control circuit of the multi-screen display controlling server, the computer program product enables the multi-screen display controlling server to perform a multi-screen display controlling operation. The computer program product comprises: a group setting module, configured to operably establish a device group relationship between a video playback device and a first portable communication device, wherein the video playback device comprises a main display, and the first portable communication device comprises a first screen; a target video providing module, configured to operably transmit a target video to the video playback device via a network, so that the video playback device displays the target video on the main display; a receiving module, configured to operably receive a first selection message corresponding to a position of a first partial region of the main display while the video playback device displays the target video on the main display; and a scaled video providing module, configured to dynamically generate a first scaled video corresponding to images displayed on the first partial region and transmits the first scaled video to the first portable communication device via a network, so that the first portable communication device simultaneously displays the first scaled video on the first screen while the main display displays the target video.

Both the foregoing general description and the following detailed description are examples and explanatory only, and are not restrictive of the invention as claimed.

BRIEF DESCRIPTION OF THE DRAWINGS

FIG. 8 shows a simplified schematic diagram of a video displaying operation according to another embodiment of the present disclosure.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
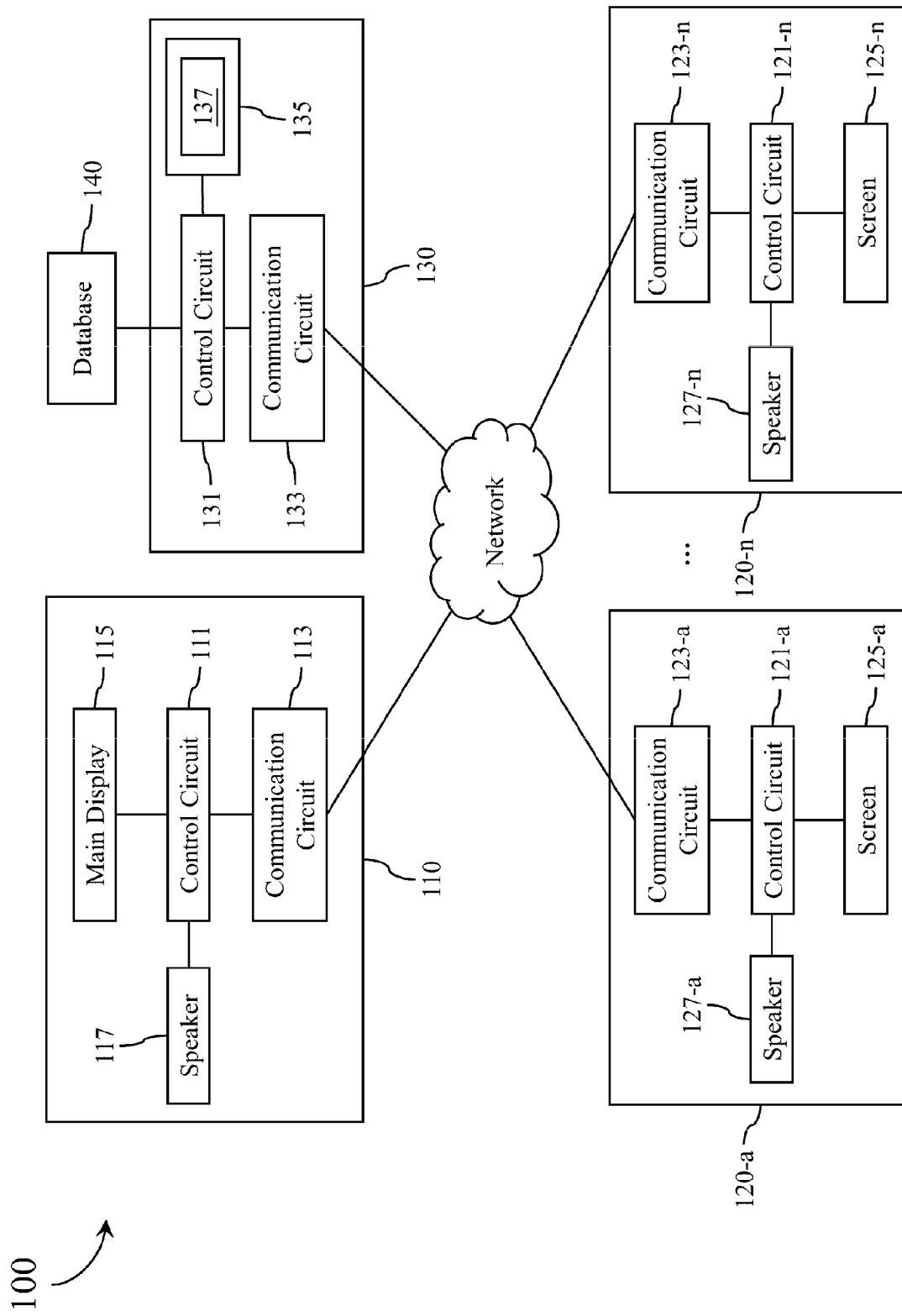
FIG. 1 shows a simplified functional block diagram of a multi-screen video playback system according to one embodiment of the present disclosure.

FIG. 1 shows a simplified functional block diagram of a multi-screen video playback system 100 according to one embodiment of the present disclosure. The multi-screen video playback system 100 comprises a video playback device 110, one or more portable communication devices 120 (e.g., the portable communication devices 120-a~120-n shown in FIG. 1), a multi-screen display controlling server 130, and a database 140. In the multi-screen video playback system 100, the video playback device 110 is configured to operably utilize a main display 115 and a speaker 117 to playback a target video to be watched by the user of the portable communication devices 120-a~120-n. The multi-screen display controlling server 130 is configured to operably establish a device group relationship among the video playback device 110 and the portable communication devices 120-a~120-n and transmit the target video to the video playback device 110 via a network. The database 140 is configured to operably store the target video. In practice, the database 140 may be realized with a single database, or may be realized with a combination of multiple databases located in the same geographical area or located in different geographical areas.

While the video playback device 110 playbacks the target video, if a user of the portable communication device 120 is interested in images displayed on a partial region of the main display 115 and wants to watch the partial region in more details, the user may configure the position and the size of the partial region by utilizing the portable communication device 120 or a remote control of the video playback device 110 (not shown in FIG. 1). Then, the video playback device 110 generates a selection message corresponding to the position of the partial region and transmits the selection message to the multi-screen display controlling server 130.

When the multi-screen display controlling server 130 received the selection message, the multi-screen display controlling server 130 dynamically generates a scaled video corresponding to the images displayed on the partial region and transmits the scaled video to the portable communication device 120, so that the portable communication device 120 simultaneously displays the scaled video while the video playback device 110 displays the target video.

The scaled video generated by the multi-screen display controlling server 130 may be a zoomed in version (i.e., enlarged version) of the images displayed on the partial region of the main display 115, or a zoomed out version (i.e., shrunk version) of the images displayed on the partial region of the main display 115. The multi-screen video playback system 100 utilizes the portable communication device 120 to display the scaled video of the partial region of the target video, which the user is interested in, so as to fulfill the user's desire to watch the details of a specific region of the target video without affecting the integrity of the target video displayed on the main display 115.

Throughout the specification and drawings, indexes a~n may be used in the reference numbers of components and devices for ease of referring to respective components and devices. The use of indexes a~n does not intend to restrict the amount of components and devices to any specific number. In the specification and drawings, if a reference number of a particular component or device is used without having the index, it means that the reference number is used to refer to any unspecific component or device of corresponding component group or device group. For example, the reference number 121-a is used to refer to the specific control circuit 121-a, and the reference number 121 is used to refer to any unspecific control circuit of the control circuits 121-a~121-n. In another example, the reference number 120-a is used to refer to the specific the portable communication device 120-a, and the reference number 120 is used to refer to any unspecific portable communication device of the portable communication devices 120-a~120-n.

In the embodiment in FIG. 1, the video playback device 110 comprises a control circuit 111, a communication circuit 113, the main display 115, and the speaker 117. The main display 115 may be realized with a flat panel display device, a projector, or other suitable display device for display the target video. Each of the portable communication devices 120-a~120-n comprises a control circuit 121, a communication circuit 123, a screen 125, and a speaker 127. The multi-screen display controlling server 130 comprises a control circuit 131, a communication circuit 133, and a non-transitory storage device 135, wherein the storage device 135 is stored with a computer program product 137. Each of the control circuits 111, 121, and 131 may be realized with one or more processor units. Each of the communication circuits 113, 123, and 133 may be realized with a wired networking circuit, a wireless networking circuit, or a hybrid circuit integrated with the functionalities of the above wired networking circuit and the wireless networking circuit. In operations, the multi-screen display controlling server 130 may communicate data with the video playback device 110 and the portable communication device 120 via a network.

In practice, the multi-screen display controlling server 130 may be realized with a single server, or may be realized with a combination of multiple servers located in the same area or located in different geographical areas.

In the multi-screen video playback system 100, the video playback device 110 may be realized with any device capable of playbacking videos, such as a computer (e.g., a tablet computer, a notebook computer, or a netbook computer), a TV, a mobile phone, an electronic book, a home theater system, or a video and audio playback system in the movie theater. The portable communication device 120 may be realized with any portable electronic device having a screen and capable of connecting to a network. For example, the portable communication device 120 may be a mobile phone, a tablet computer, a notebook computer, a netbook computer, an electronic book, or a handheld game console. The aforementioned network may be the internet or an intranet adopting various communication protocols.

Figure 2:
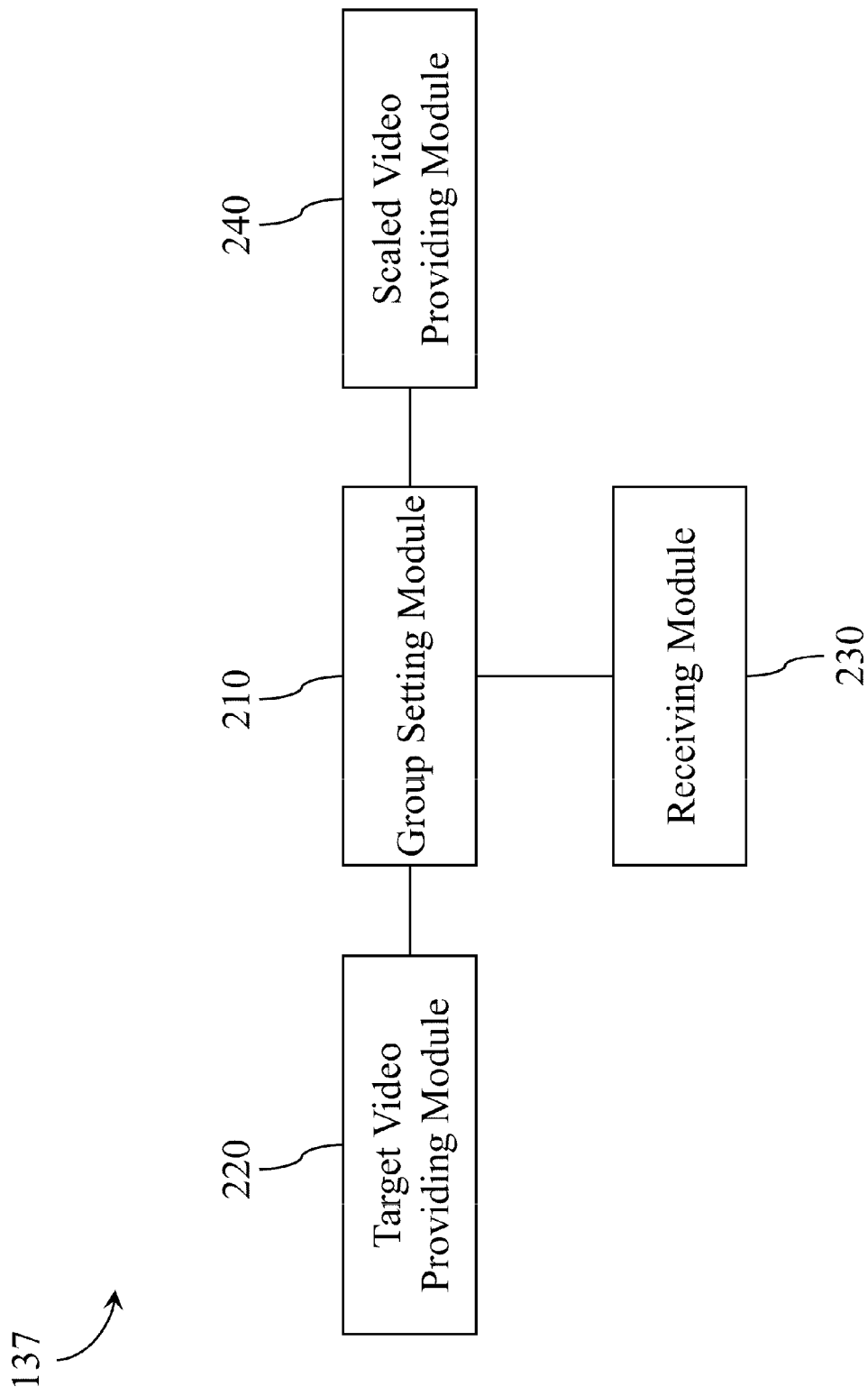
FIG. 2 shows a simplified schematic diagram of functional modules of a computer program product stored in the multi-screen display controlling server in FIG. 1 according to one embodiment of the present disclosure.

The computer program product 137 stored in the multi-screen display controlling server 130 may be realized with one or more application program modules. For example, FIG. 2 shows a simplified schematic diagram of functional modules of the computer program product 137 in FIG. 1 according to one embodiment of the present disclosure. In this embodiment, the computer program product 137 comprises a group setting module 210, a target video providing module 220, a receiving module 230, and a scaled video providing module 240.

The operations of the multi-screen video playback system 100 will be further described in the following with reference to FIG. 3 through FIG. 5.

Figure 3:
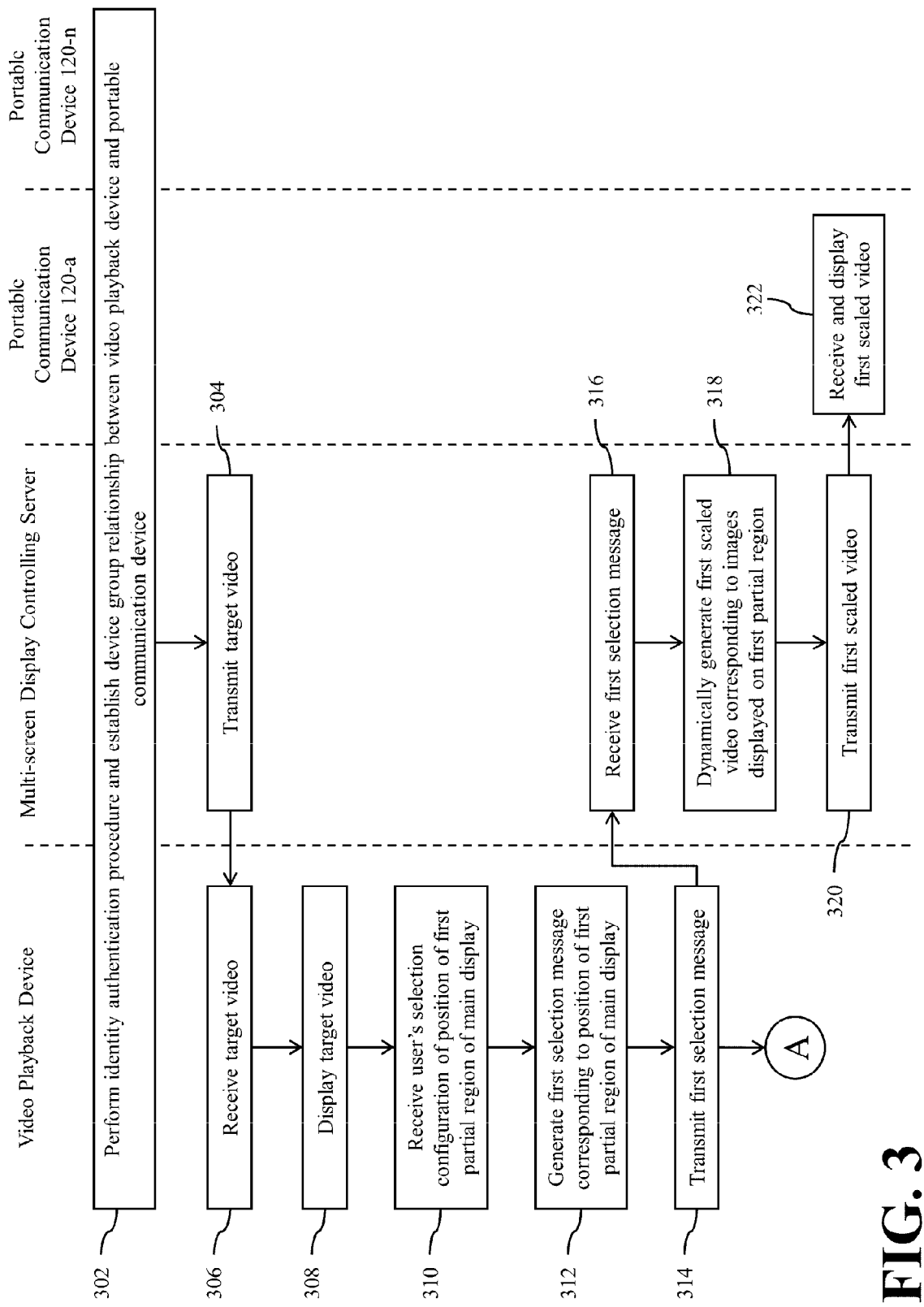
FIGS. 3 and 4 collectively show a simplified flowchart illustrating a video playback method according to one embodiment of the present disclosure.
Figure 4:
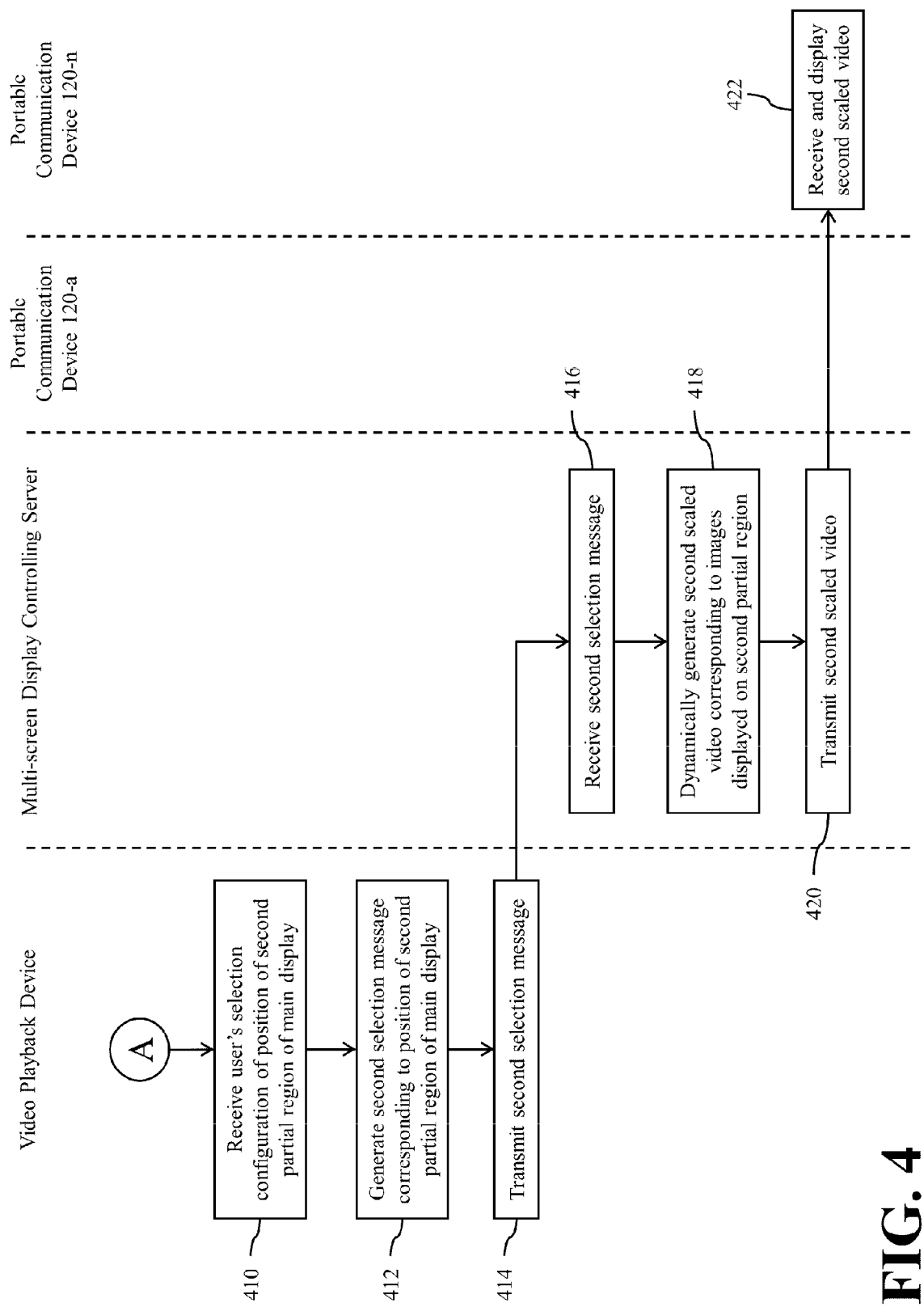
Figure 5:
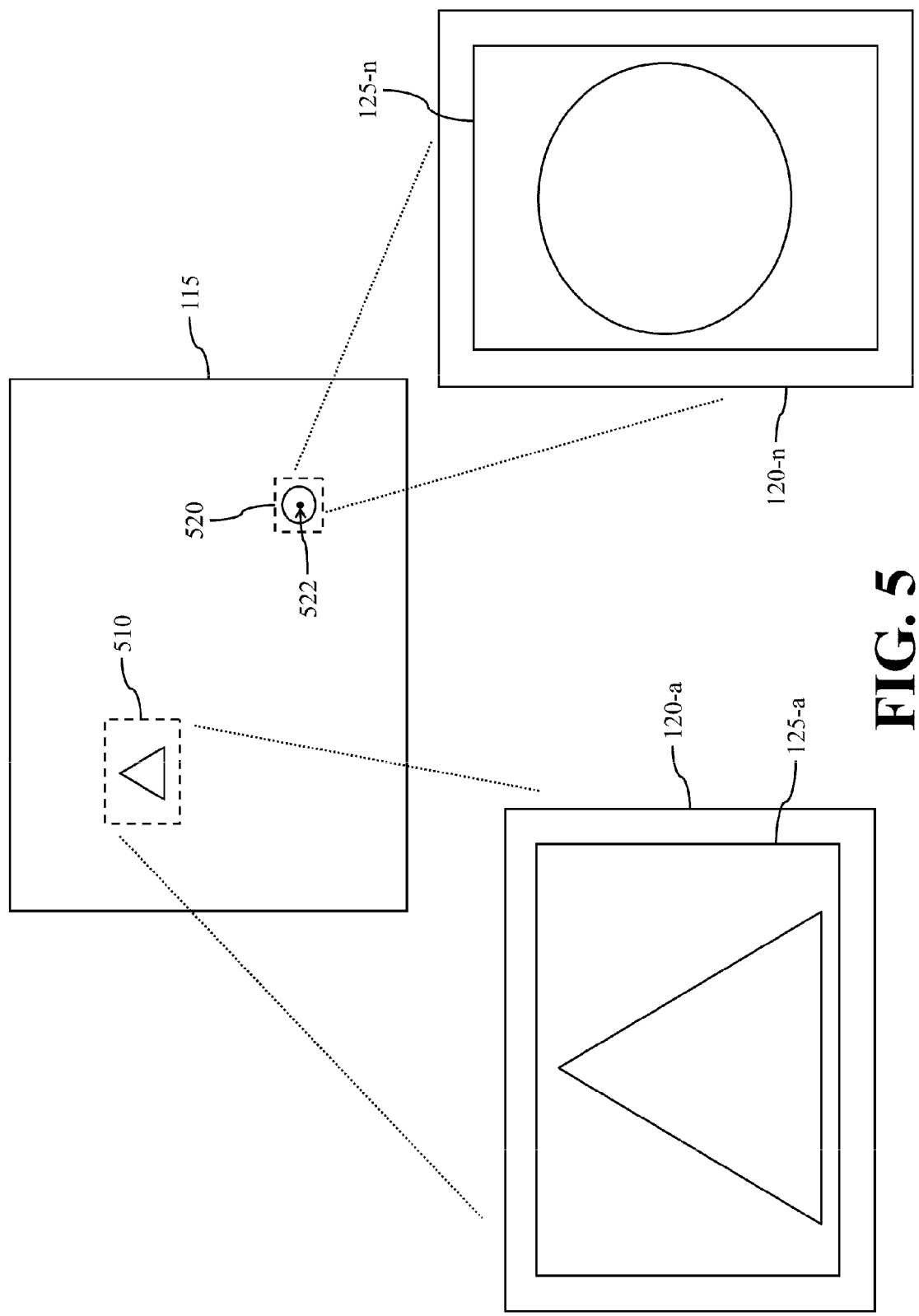
FIG. 5 shows a simplified schematic diagram of a video displaying operation according to one embodiment of the present disclosure.

FIGS. 3 and 4 collectively show a simplified flowchart illustrating a video playback method according to one embodiment of the present disclosure. FIG. 5 shows a simplified schematic diagram of a video displaying operation according to one embodiment of the present disclosure.

In the flowchart of FIG. 3, operations within a column under the name of a specific device are operations to be performed by the specific device. For example, operations within a column under the label "video playback device" are operations to be performed by the video playback device 110; operations within a column under the label "portable communication device" are operations to be performed by the portable communication device 120; operations within a column under the label "multi-screen display controlling server" are operations to be performed by the multi-screen display controlling server 130; and so forth. The same analogous arrangement also applies to the subsequent flowcharts.

When performing the video playback method of each flowchart in the drawings, the control circuit 131 of the multi-screen display controlling server 130 executes the computer program product 137 to enable the multi-screen display controlling server 130 to perform a multi-screen display controlling operation comprising some or all operations within the corresponding column.

When the user of the portable communication device 120 wants to watch the target video, the video playback device 110 and the portable communication device 120 may be utilized to perform an operation 302 to establish a device group relationship between the video playback device 110 and the portable communication device 120.

In the operation 302, the video playback device 110 utilizes the communication circuit 113 to communicate with the multi-screen display controlling server 130 via a network, and each portable communication device 120 utilizes the communication circuit 123 to communicate with the multi-screen display controlling server 130 via a network. Then, the group setting module 210 of the multi-screen display controlling server 130 conducts an identity authentication procedure to the video playback device 110 and the portable communication device 120, and establishes a device group relationship between the video playback device 110 and the portable communication device 120.

For example, the group setting module 210 may request the user of the video playback device 110 to select or input a specific group ID. When the portable communication device 120 establishes a connection with the multi-screen display controlling server 130, the multi-screen display controlling server 130 may request the user of the portable communication device 120 to select or input a group ID. When the group ID configured by the portable communication device 120 matches with the group ID configured by the video playback device 110, the group setting module 210 sets the video playback device 110 and the portable communication device 120 using the same group ID as the same device group.

Alternatively, the video playback device 110 and the portable communication device 120 may utilize appropriate communication circuits, such as near field communication (NFC) circuits, Bluetooth circuits, WiFi circuits, or the like, to conduct device matching between each other in the operation 302, and the matching information may be transmitted to the multi-screen display controlling server 130 from the video playback device 110. When the receiving module 230 of the multi-screen display controlling server 130 received the matching information from the video playback device 110, the group setting module 210 determines that the video playback device 110 and the portable communication device 120 specified in the matching information passed the identity authentication procedure, and sets the video playback device 110 and the portable communication device 120 as the same device group.

In the operation 304, the target video providing module 220 of the multi-screen display controlling server 130 retrieves the target video requested by the user of the portable communication device 120 from the database 140, and utilizes the communication circuit 133 to transmit the retrieved target video to the video playback device 110 via the network.

In the operation 306, the control circuit 111 of the video playback device 110 utilizes the communication circuit 113 to receive the target video from the multi-screen display controlling server 130.

In the operation 308, the control circuit 111 configures the main display 115 to display the video content of the target video, and configures the speaker 117 to playback the audio content of the target video.

While the main display 115 displays the target video, if the user of the portable communication device 120-a is interested in images displayed on a first partial region 510 of the main display 115 and wants to watch the images displayed on the first partial region 510 in more details, the user may utilize a remote control of the video playback device 110 (not shown in the drawings) to configure the position and the size of the first partial region 510.

In this situation, the video playback device 110 utilizes a corresponding remote control signal receiving circuit (not shown in the drawings) to receive the user's selection configuration with respect to the position of the first partial region 510 on the main display 115. In practice, the video playback device 110 may display the boundary of the first partial region 510 on the main display 115 or may display only the location of the center point of the first partial region 510 on the main display 115.

In the operation 312, the control circuit 111 of the video playback device 110 generates a first selection message corresponding to the position of the first partial region 510 according to the received selection configuration. In practice, the first selection message may comprise the information of the coordination, the shape, the size, the boundary of the first partial region 510, or other suitable position information. In some embodiments, the first selection message may comprise only the location information of the center point of the first partial region 510.

In the operation 314, the control circuit 111 configures the communication circuit 113 to transmit the first selection message to the multi-screen display controlling server 130 via the network.

In the operation 316, the receiving module 230 of the multi-screen display controlling server 130 receives the first selection message transmitted from the video playback device 110.

In the operation 318, the scaled video providing module 240 of the multi-screen display controlling server 130 obtains the position information of the first partial region 510 according to the first selection message, and dynamically generates a first scaled video corresponding to the images displayed on the first partial region 510.

In practice, the scaled video providing module 240 may retrieve image contents corresponding to the first partial region 510 of the main display 115 from the database 140 according to the position information of the first partial region 510. Then, the scaled video providing module 240 may perform an interpolation operation on the image contents corresponding to the first partial region 510 to generate a zoomed in version (i.e., enlarged version) of the images corresponding to the first partial region 510, and utilize the zoomed in version of the images as the first scaled video. The interpolation operation increases the resolution of the images so that the first scaled video generated by the scaled video providing module 240 has a higher resolution than the images displayed on the first partial region 510 of the main display 115.

In this embodiment, the performance of image scaling operation of the multi-screen display controlling server 130 is higher than that of the portable communication device 120-*a*. By utilizing the scaled video providing module 240 to generate the first scaled video corresponding to the images of the first partial region 510, the image quality of the first scaled video may be effectively enhanced and the hardware requirement of the portable communication device 120-*a* in terms of the image scaling performance may be effectively reduced.

In other embodiments, the video producer may prepare one or more higher-resolution versions of the target video and stores the one or more higher-resolution versions of the target video in the database 140. Namely, for any part of the target video stored in the database 140, at least two versions of different resolutions are available for the multi-screen display controlling server 130. In this embodiment, the target video providing module 220 of the multi-screen display controlling server 130 may retrieve a predetermined resolution version of the target video from the database 140 in the operation 304, and transmits the predetermined resolution version of the target video to the video playback device 110 via the network. In the operation 318, the scaled video providing module 240 of the multi-screen display controlling server 130 may retrieve a higher resolution version of the target video from the database 140. The scaled video providing module 240 may extract the image contents corresponding to the first partial region 510 from the higher resolution version of the target video to form the zoomed in version of the images displayed on the first partial region 510, and utilize the zoomed in version as the first scaled video.

For example, the aforementioned predetermined resolution version of the target video may be a standard-definition (SD) version of the target video, and the higher resolution version of the target video may be a Full-HD version, a Super Hi-Vision version, or other higher resolution versions of the target video.

As a result, the resolution of the first scaled video generated by the scaled video providing module 240 would be higher than the resolution of the images displayed on the first partial region 510 of the main display 115. By utilizing the scaled video providing module 240 to generate the first scaled video corresponding to the images of the first partial region 510, the image quality of the first scaled video may be effectively enhanced and the hardware requirement of the portable communication device 120-*a* in terms of the image scaling performance may be effectively reduced.

In the operation 320, the scaled video providing module 240 utilizes the communication circuit 133 to transmit the first scaled video to the portable communication device 120-*a* via the network.

In the operation 322, the communication circuit 123-*a* of the portable communication device 120-*a* receives the first scaled video transmitted from the multi-screen display controlling server 130. In this case, the control circuit 121-*a* configures the screen 125-*a* to simultaneously display the video content of the first scaled video and configures the speaker 127-*a* to simultaneously playback the audio content of the first scaled video while the main display 115 displays the target video. In the embodiment in FIG. 5, the total area of the first partial region 510 is less than the total area of the screen 125-*a*.

In practice, while the portable communication device 120-*a* playbacks the first scaled video, the main display 115 of the video playback device 110 is still displaying the target video and the speaker 117 is still playbacking the audio content of the target video. Therefore, the first scaled video generated in the operation 318 may comprise only the video content and not comprise the audio content for reducing the file size of the first scaled video. In this situation, the portable communication device 120-*a* only needs to display the video content of the first scaled video on the screen 125-*a* in the operation 322, and does not need to play sound with the speaker 127-*a*.

While the main display 115 displays the target video, if the user of the portable communication device 120-*n* is interested in images displayed on a second partial region 520 of the main display 115 and wants to watch the images displayed on the second partial region 520 in more details, the user may utilize a remote control of the video playback device 110 (not shown in the drawings) to configure the position and the size of the second partial region 520.

As shown in FIG. 4, in this situation, the video playback device 110 utilizes a corresponding remote control signal receiving circuit (not shown in the drawings) to receive the user's selection configuration with respect to the position of the second partial region 520 on the main display 115. In practice, the video playback device 110 may display the boundary of the second partial region 520 on the main display 115 or may display only the location of a center point 522 of the second partial region 520 on the main display 115.

In the operation 412, the control circuit 111 of the video playback device 110 generates a second selection message corresponding to the position of the second partial region 520 according to the received selection configuration. In practice, the second selection message may comprise the information of the coordination, the shape, the size, the boundary of the second partial region 520, or other suitable position information. In some embodiments, the second selection message may comprise only the location information of the center point 522 of the second partial region 520.

In the operation 414, the control circuit 111 configures the communication circuit 113 to transmit the second selection message to the multi-screen display controlling server 130 via the network.

In the operation 416, the receiving module 230 of the multi-screen display controlling server 130 receives the second selection message transmitted from the video playback device 110.

In the operation 418, the scaled video providing module 240 of the multi-screen display controlling server 130 obtains the position information of the second partial region 520 according to the second selection message, and dynamically generates a second scaled video corresponding to the images displayed on the second partial region 520.

As described above, the scaled video providing module 240 may retrieve image contents corresponding to the second partial region 520 of the main display 115 from the database 140 according to the position information of the second partial region 520. Then, the scaled video providing module 240 may perform an interpolation operation on the image contents corresponding to the second partial region 520 to generate a zoomed in version (i.e., enlarged version) of the images corresponding to the second partial region 520, and utilize the zoomed in version of the images as the second scaled video. As a result, a resolution of the second scaled video generated by the scaled video providing module 240 is higher than the resolution of the images displayed on the second partial region 520 of the main display 115

In this embodiment, the performance of image scaling operation of the multi-screen display controlling server 130 is higher than that of the portable communication device 120-*n*. By utilizing the scaled video providing module 240 to generate the second scaled video corresponding to the images of the second partial region 520, the image quality of the second scaled video may be effectively enhanced and the hardware requirement of the portable communication device 120-*n* in terms of the image scaling performance may be effectively reduced.

In the embodiments where the database 140 further stores one or more higher-resolution versions of the target video, the scaled video providing module 240 of the multi-screen display controlling server 130 may retrieve a higher resolution version of the target video from the database 140 in the operation 418. The scaled video providing module 240 may extract the image contents corresponding to the second partial region 520 from the higher resolution version of the target video to form the zoomed in version of the images displayed on the second partial region 520, and utilize the zoomed in version as the second scaled video. Similarly, the aforementioned higher resolution version of the target video may be configured to be a Full-HD version, a Super Hi-Vision version, or other higher resolution versions.

As a result, the resolution of the second scaled video generated by the scaled video providing module 240 would be higher than the resolution of the images displayed on the second partial region 520 of the main display 115. By utilizing the scaled video providing module 240 to generate the second scaled video corresponding to the images of the second partial region 520, the image quality of the second scaled video may be effectively enhanced and the hardware requirement of the portable communication device 120-*n* in terms of the image scaling performance may be effectively reduced.

In the operation 420, the scaled video providing module 240 utilizes the communication circuit 133 to transmit the second scaled video to the portable communication device 120-*n* via the network.

In the operation 422, the communication circuit 123-*n* of the portable communication device 120-*n* receives the second scaled video transmitted from the multi-screen display controlling server 130. In this case, the control circuit 121-*n* configures the screen 125-*n* to simultaneously display the video content of the second scaled video and configures the speaker 127-*n* to simultaneously play the audio content of the second scaled video while the main display 115 displays the target video. In the embodiment in FIG. 5, the total area of the second partial region 520 is less than the total area of the screen 125-*n*.

In practice, while the portable communication device 120-*n* playbacks the second scaled video, the main display 115 of the video playback device 110 is still displaying the target video and the speaker 117 is still playbacking the audio content of the target video. Therefore, the second scaled video generated in the operation 418 may comprise only the video content and not comprise the audio content for reducing the file size of the second scaled video. In this situation, the portable communication device 120-*n* only needs to display the video content of the second scaled video on the screen 125-*n* in the operation 422, and does not need to play sound with the speaker 127-*n*.

In the embodiment of FIGS. 3 and 4, the user utilizes the remote control of the video playback device 110 to configure the positions and the sizes of the partial regions of the target video. This is merely an embodiment rather than a restriction to the practical implementations of the invention. As described above, the user may utilize the portable communication device 120 to configure the position and the size of the partial region. Another operation of the multi-screen video playback system 100 will be described below with reference to FIGS. 6~8.

Figure 6:
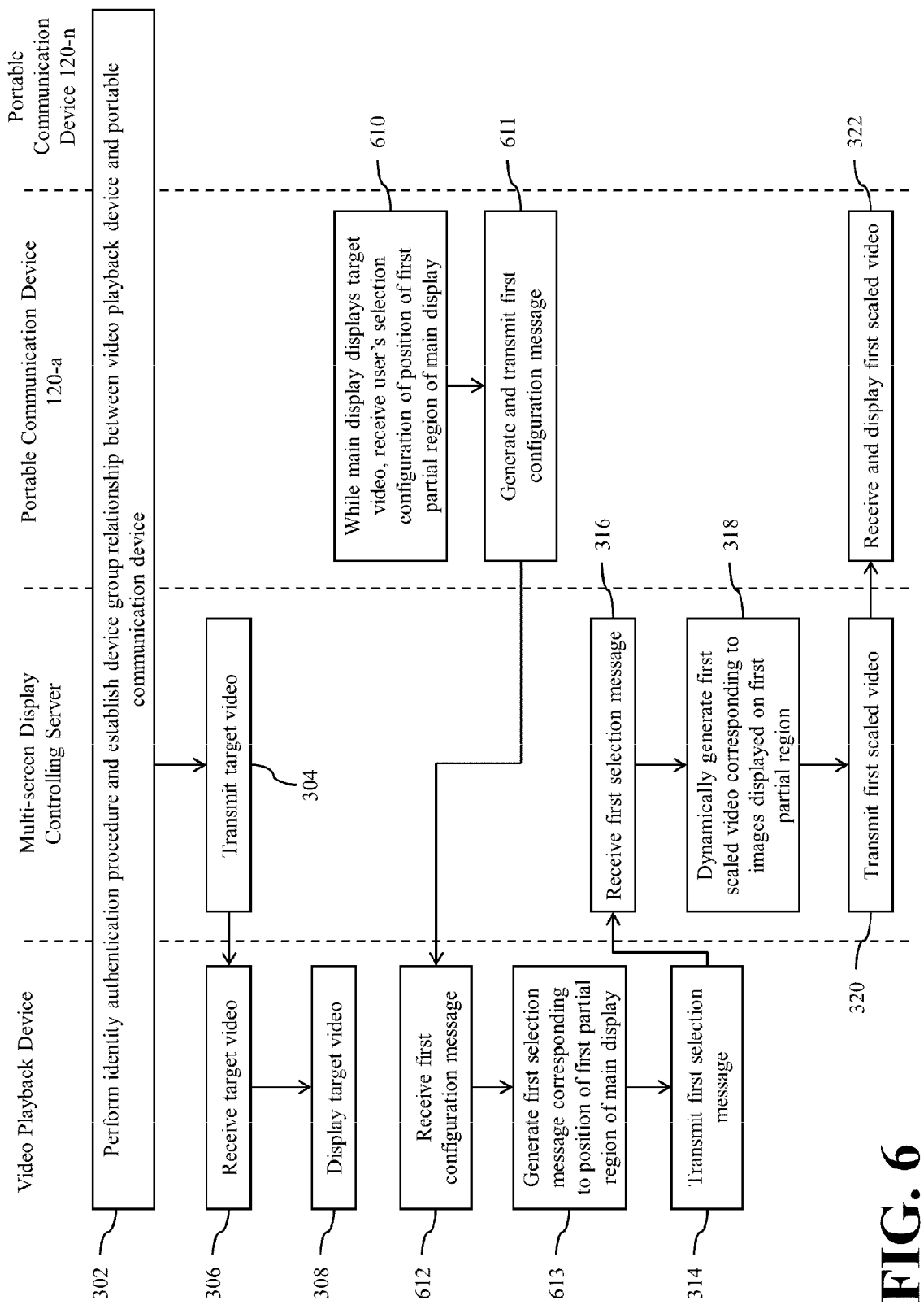
FIGS. 6 and 7 collectively show a simplified flowchart of a video playback method according to another embodiment of the present disclosure.
Figure 7:
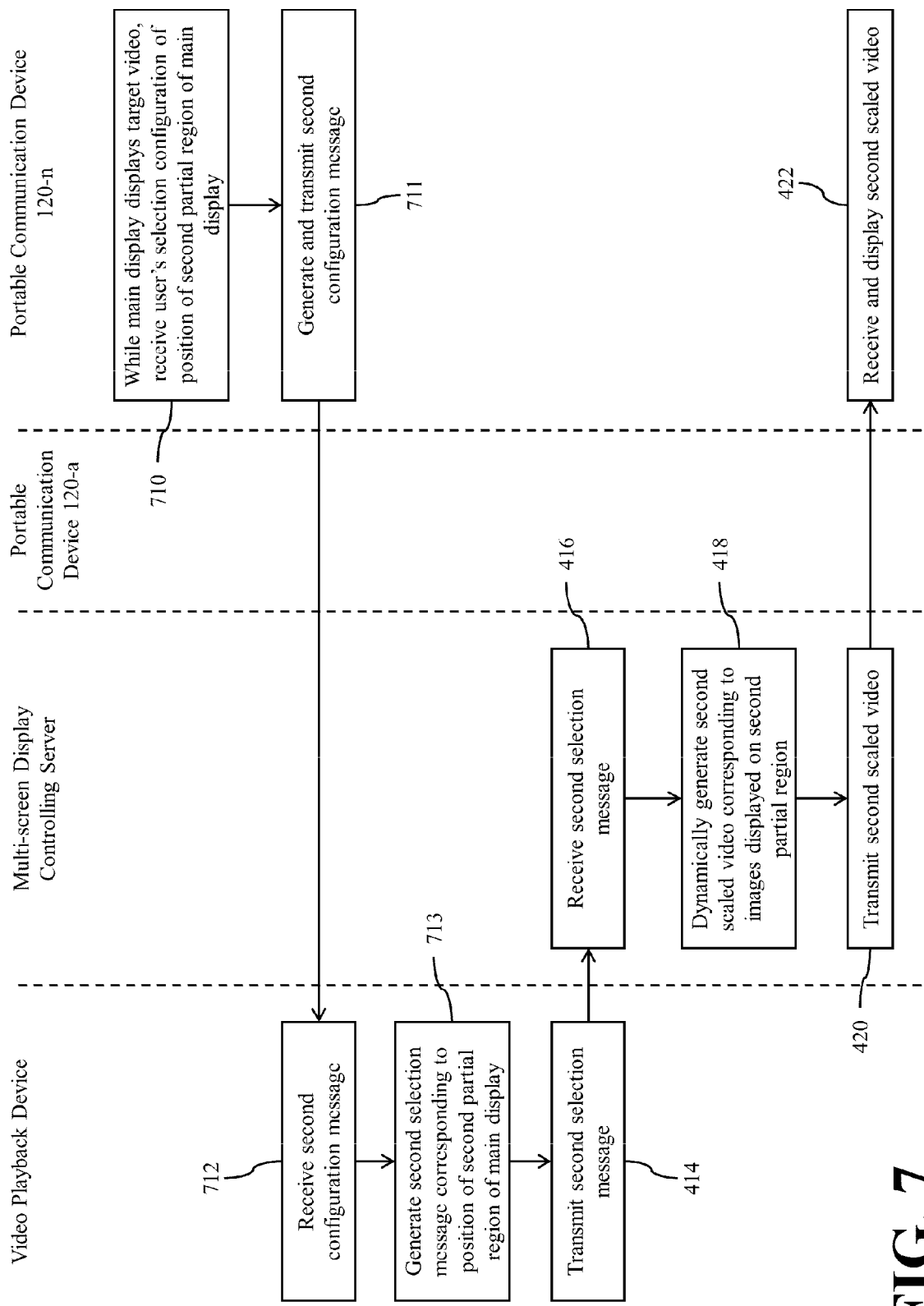

FIGS. 6 and 7 collectively show a simplified flowchart of a video playback method according to another embodiment of the present disclosure. FIG. 8 shows a simplified schematic diagram of a video displaying operation according to another embodiment of the present disclosure.

The operations 302~308 in FIG. 6 are the same as the operations 302~308 in FIG. 3. Accordingly, the descriptions regarding the operations, implementations, and related advantages for the operations 302~308 in FIG. 3 are also applicable to the embodiment of FIG. 6.

As shown in FIG. 8, the portable communication device 120-*a* of this embodiment utilizes the screen 125-*a* to display a user control interface 810, and the portable communication device 120-*n* utilizes the screen 125-*n* to display a user control interface 820. While the main display 115 displays the target video, if the user of the portable communication device 120-*a* is interested in images displayed on the first partial region 510 of the main display 115 and wants to watch the images displayed on the first partial region 510 in more details, the user may configures the position and the size of the first partial region 510 through the user control interface 810 on the screen 125-*a*. For example, the user may configure the position of the first partial region 510 by adjusting the position of an indicator block 812 in the user control interface 810. The user may also configure the size of the first partial region 510 by adjusting the size of the indicator block 812.

In this situation, the control circuit 121-*a* of the portable communication device 120-*a* performs the operation 610 in FIG. 6 for receiving the user's selection configuration of the position of the first partial region 510 of the main display 115. In practice, the video playback device 110 may display the boundary of the first partial region 510 on the main display 115 or may display only the location of the center point of the first partial region 510 on the main display 115.

In the operation 611, the control circuit 121-*a* generates a first configuration message corresponding to the position of the first partial region 510 according to the received selection configuration, and configures the communication circuit 123-*a* to transmit the first configuration message to the video playback device 110. In practice, the first configuration message may comprise the information of the coordination, the shape, the size, the boundary of the first partial region 510, or other suitable position information. In some embodiments, the first configuration message may comprise only the location information of the center point of the first partial region 510.

In the operation 612, the communication circuit 113 of the video playback device 110 receives the first configuration message transmitted from the portable communication device 120-*a*.

In the operation 613, the control circuit 111 of the video playback device 110 generates a first selection message corresponding to the position of the first partial region 510 of the main display 115 according to the received first configuration message. In practice, the first selection message may comprise the information of the coordination, the shape, the size, the boundary of the first partial region 510, or other suitable position information. In some embodiments, the first selection message may comprise only the location information of the center point of the first partial region 510.

The following operations 314~322 in FIG. 6 are the same as the operations 314~322 in FIG. 3. Accordingly, the descriptions regarding the operations, implementations, and related advantages for the operations 314~322 in FIG. 3 are also applicable to the embodiment of FIG. 6.

Similarly, while the main display 115 displays the target video, if the user of the portable communication device 120-*n* is interested in images displayed on the second partial region 520 of the main display 115 and wants to watch the images displayed on the second partial region 520 in more details, the user may configure the position and the size of the second partial region 520 through the user control interface 820 of the screen 125-*n*. For example, the user may configure the position of the second partial region 520 by adjusting the position of an indicator point 822 in the user control interface 820.

In this situation, the control circuit 121-*n* of the portable communication device 120-*n* performs the operation 710 in FIG. 7 for receiving the user's selection configuration of the position of the second partial region 520 of the main display 115. In practice, the video playback device 110 may display the boundary of the second partial region 520 on the main display 115 or display only the location of the center point 522 of the partial region 520 on the main display 115.

In the operation 711, the control circuit 121-*n* generates a second configuration message corresponding to the position of the second partial region 520 according to the received selection configuration, and configures the communication circuit 123-*n* to transmit the second configuration message to the video playback device 110. In practice, the second configuration message may comprise only the location information of the center point 522 of the second partial region 520.

In the operation 712, the communication circuit 113 of the video playback device 110 receives the second configuration message transmitted from the portable communication device 120-*n*.

In the operation 713, the control circuit 111 of the video playback device 110 generates a second selection message corresponding to the position of the second partial region 520 of the main display 115 according to the received second configuration message. In practice, the second selection message may comprise only the location information of the center point 522 of the second partial region 520.

The following operations 414~422 in FIG. 7 are the same as the operations 414~422 in FIG. 4. Accordingly, the descriptions regarding the operations, implementations, and related advantages for the operations 414~422 in FIG. 4 are also applicable to the embodiment of FIG. 7.

It can be appreciated from the foregoing descriptions that the proposed multi-screen video playback system 100 utilizes the popular portable communication devices 120-*a*~120-*n* to simultaneously display scaled videos to provide more image details of partial image region to the audiences, while maintaining the integrity of the target video displayed on the main display 115. Accordingly, the multi-screen video playback system 100 not only greatly increase the audiences' selection flexibility in viewing image details, but also provides more diversified video presenting approaches to the movie producer or TV producer. As a result, the audiences are enabled to obtain more rich and more different experience in watching videos.

In addition, the aforementioned first and second scaled videos are dynamically generated by the multi-screen display controlling server 130. This approach effectively increases the image quality of the resulting scaled videos and reduce the hardware requirement of the portable communication devices 120-*a*~120-*n* in terms of the image scaling performance. As a result, the cost and circuitry complexity of the portable communication devices 120-*a*~120-*n* can be effectively reduced.

Furthermore, in the applications where multiple audiences get together to watch the same video, the multi-screen video playback system 100 is capable of utilizing different portable communication devices 120-*a*~120-*n* to simultaneously display different scaled videos to different audiences, thereby fulfilling the different requirements of the audiences. In this way, the applications and functionalities of the multi-screen video playback system 100 may be greatly extended.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an openended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multi-screen video playback system for dynamically generating a scaled video, comprising:
    a video playback device comprising a main display;
    a first portable communication device comprising a first screen; and
    a multi-screen display controlling server, configured to operably conduct an identity authentication procedure to the video playback device and the first portable communication device to establish a device group relationship between the video playback device and the first portable communication device, and to transmit a target video to the video playback device via a network so that the video playback device displays the target video on the main display while the first portable communication device does not playback the target video while the main display displays the target video;
    wherein while the main display displays the target video, if the multi-screen display controlling server received a first selection message corresponding to a position of a first partial region of the main display and transmitted from the video playback device, the multi-screen display controlling server dynamically generates a first scaled video corresponding to images displayed on the first partial region and transmits the first scaled video to the first portable communication device via a network, so that the first portable communication device simultaneously displays the first scaled video on the first screen.

2. The multi-screen video playback system of claim 1, wherein the first selection message comprises a boundary information of the first partial region.

3. The multi-screen video playback system of claim 1, wherein the first selection message comprises a location information of a center point of the first partial region.

4. The multi-screen video playback system of claim 1, wherein a total area of the first partial region is less than a total area of the first screen.

5. The multi-screen video playback system of claim 1, wherein when a user utilizes a remote control of the video playback device to select the first partial region of the main display, the video playback device generates and transmits the first selection message to the multi-screen display controlling server.

6. The multi-screen video playback system of claim 1, wherein the first portable communication device utilizes the first screen to display the first scaled video and a user control interface, and when a user utilizes the user control interface to select the first partial region of the main display, the first portable communication device generates and transmits a first configuration message corresponding to the position of the first partial region to the video playback device;
wherein the video playback device generates the first selection message according to the first configuration message and transmits the first selection message to the multi-screen display controlling server.

7. The multi-screen video playback system of claim 1, wherein the first scaled video is a zoomed in version of images displayed on the first partial region, or a zoomed out version of images displayed on the first partial region.

8. The multi-screen video playback system of claim 7, wherein the multi-screen display controlling server performs an interpolation operation on images corresponding to the first partial region to generate the zoomed in version of the images displayed on the first partial region.

9. The multi-screen video playback system of claim 7, wherein the multi-screen display controlling server extracts image contents corresponding to the first partial region from a higher resolution version of the target video to form the zoomed in version of the images displayed on the first partial region.

10. The multi-screen video playback system of claim 1, further comprising:
a second portable communication device comprising a second screen;
wherein the multi-screen display controlling server further establishes a device group relationship between the video playback device and the second portable communication device; and while the main display displays the target video, if the multi-screen display controlling server received a second selection message corresponding to a position of a second partial region of the main display, the multi-screen display controlling server dynamically generates a second scaled video corresponding to images displayed on the second partial region and transmits content of the second scaled video to the second portable communication device via a network, so that the second portable communication device simultaneously displays the second scaled video on the second screen.

11. A computer program product, stored in a non-transitory storage device of a multi-screen display controlling server for dynamically generating a scaled video, when executed by a control circuit of the multi-screen display controlling server, enabling the multi-screen display controlling server to perform a multi-screen display controlling operation, the computer program product comprising:
a group setting module, configured to operably conduct an identity authentication procedure to the video playback device and the first portable communication device to establish a device group relationship between a video playback device and a first portable communication device, wherein the video playback device comprises a main display, and the first portable communication device comprises a first screen;
a target video providing module, configured to operably transmit a target video to the video playback device via a network, so that the video playback device displays the target video on the main display while the first portable communication device does not playback the target video while the main display displays the target video;
a receiving module, configured to operably receive a first selection message corresponding to a position of a first partial region of the main display and transmitted from the video playback device while the video playback device displays the target video on the main display; and
a scaled video providing module, configured to dynamically generate a first scaled video corresponding to images displayed on the first partial region and transmits the first scaled video to the first portable communication device via a network, so that the first portable communication device simultaneously displays the first scaled video on the first screen while the main display displays the target video.

12. The computer program product of claim 11, wherein the first selection message comprises a boundary information of the first partial region.

13. The computer program product of claim 11, wherein the first selection message comprises a location information of a center point of the first partial region.

14. The computer program product of claim 11, wherein a total area of the first partial region is less than a total area of the first screen.

15. The computer program product of claim 11, wherein the receiving module receives the first selection message from the video playback device.

16. The computer program product of claim 11, wherein the first scaled video is a zoomed in version of images displayed on the first partial region, or a zoomed out version of images displayed on the first partial region.

17. The computer program product of claim 16, wherein the scaled video providing module performs an interpolation operation on images corresponding to the first partial region to generate the zoomed in version of the images displayed on the first partial region.

18. The computer program product of claim 16, wherein the scaled video providing module extracts image contents corresponding to the first partial region from a higher resolution version of the target video to form the zoomed in version of the images displayed on the first partial region.

19. The computer program product of claim 11, wherein the group setting module further establishes a device group relationship between the video playback device and a second portable communication device comprising a second screen;
wherein while the main display displays the target video, if the receiving module received a second selection message corresponding to a position of a second partial region of the main display, the scaled video providing module dynamically generates a second scaled video corresponding to images displayed on the second partial region and transmits the second scaled video to the second portable communication device via a network, so that the second portable communication device simultaneously displays the second scaled video on the second screen.

* * * * *